United States Patent
Rajagopal et al.

(10) Patent No.: US 11,212,155 B2
(45) Date of Patent: Dec. 28, 2021

(54) SYSTEM AND METHOD FOR ENHANCING RECEPTION IN WIRELESS COMMUNICATION SYSTEMS

(71) Applicant: AltioStar Networks, Inc., Tewksbury, MA (US)

(72) Inventors: Sriram Rajagopal, Bangalore (IN); Vinoth Nagarajan, Bangalore (IN); Venkatesh Hampasandra Muralidhara, Bangalore (IN)

(73) Assignee: AltioStar Networks, Inc., Tewksbury, MA (US)

( * ) Notice: Subject to any disclaimer, the term of this patent is extended or adjusted under 35 U.S.C. 154(b) by 27 days.

(21) Appl. No.: 16/445,970

(22) Filed: Jun. 19, 2019

(65) Prior Publication Data
US 2020/0403840 A1    Dec. 24, 2020

(51) Int. Cl.
H04L 27/26    (2006.01)
H04W 56/00    (2009.01)
H04W 88/08    (2009.01)

(52) U.S. Cl.
CPC ..... *H04L 27/2662* (2013.01); *H04W 56/0035* (2013.01); *H04W 88/08* (2013.01)

(58) Field of Classification Search
CPC .......... H04L 27/2662; H04W 56/0035; H04W 88/08
See application file for complete search history.

(56) References Cited

U.S. PATENT DOCUMENTS

| 7,058,002 B1 * | 6/2006 | Kumagai | H04L 27/2662 370/203 |
| 2007/0030915 A1 * | 2/2007 | Bhukania | H04L 27/22 375/261 |
| 2017/0272288 A1 * | 9/2017 | Shahmohammadian | H04L 27/02 |

(Continued)

FOREIGN PATENT DOCUMENTS

EP    2068521 A1    6/2009

OTHER PUBLICATIONS

Ji-Heon Kim et al., "Frequency Domain-DFE coupled with Common Phase Error Tracking Loop in OFDM Systems", 2005 IEEE 61st Vehicular Technology Conference. VTC 2005-Spring; May 30-Jun. 1, 2005; Stockholm, Sweden, IEEE, Piscataway, NJ, USA, vol. 2, May 30, 2005 (May 30, 2005), pp. 1248-1252.

(Continued)

*Primary Examiner* — Walter J Divito
*Assistant Examiner* — Anthony Luo
(74) *Attorney, Agent, or Firm* — Mintz Levin Cohn Ferris Glovsky and Popeo, P.C.

(57) ABSTRACT

A method, an apparatus and a computer program product for enhancing reception of signals in a wireless communication system. A signal containing a frame including a plurality of symbols is received on an uplink communication channel. An angular position of at least one symbol in the plurality of symbols in a constellation of symbols is detected. The plurality of symbols include equalized symbols. An angular difference corresponding a phase error between the detected angular position of the symbol and an expected reference angular position in the constellation of symbols corresponding to an expected reference symbol corresponding to the received frame is determined. Using the determined phase error, a phase of the symbol is compensated.

39 Claims, 14 Drawing Sheets

(56) References Cited

U.S. PATENT DOCUMENTS

2018/0131488 A1* 5/2018 Noh .................... H04L 25/0224
2018/0167856 A1* 6/2018 Li .......................... H04W 28/00
2020/0178222 A1* 6/2020 Wang ................... H04L 1/1812

OTHER PUBLICATIONS

International Search Report and Written Opinion, dated Sep. 18, 2020, PCT/US2020/070154, international filing date: Jun. 18, 2020.

\* cited by examiner

SYSTEM AND METHOD FOR ENHANCING RECEPTION IN WIRELESS COMMUNICATION SYSTEMS

TECHNICAL FIELD

In some implementations, the current subject matter relates to telecommunications systems, and in particular, to improving or enhancing signal reception in extreme channel conditions, such as high speed travel conditions, in wireless communications systems, such as, for example, but not limited to, long term evolution communications systems, 5G New Radio ("NR") communications systems, and any other systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G LTE standard is currently being developed. LTE is based on the GSM/EDGE and UMTS/HSPA digital cellular technologies and allows for increasing capacity and speed by using a different radio interface together with core network improvements.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Mobile devices located in extreme channel conditions typically experience poor quality of service, inadequate signal reception, and other drawbacks. These extreme channel conditions may include mobile devices traveling at high speeds, such as in high speed trains, cars, etc. Thus, there is a need to improve quality of reception in extreme channel conditions.

SUMMARY

In some implementations, the current subject matter relates to a computer-implemented method for enhancing reception of signals in a wireless communications system. The method may include receiving a signal containing a frame including a plurality of symbols on an uplink communication channel, detecting an angular position of at least one symbol in the plurality of symbols in a constellation of symbols, wherein the plurality of symbols include equalized symbols, determining an angular difference corresponding a phase error between the detected angular position of the at least one symbol and an expected reference angular position in the constellation of symbols corresponding to an expected reference symbol corresponding to the received frame, and compensating, using the determined phase error, a phase of the at least one symbol.

In some implementations, the current subject matter can include one or more of the following optional features. In some implementations, at least one of the receiving, the detecting, the determining, and the compensating can be performed by a base station having at least one processor communicatively coupled to at least one memory. The base station can further include a radio transmitter and a radio receiver. The base station can include at least one of the following: an eNodeB base station, a gNodeB base station, and any combination thereof. The uplink communication channel can be established between the base station and at least one user equipment.

In some implementations, at least one of the receiving, the detecting, the determining, and the compensating can be performed by one or more components at Layer 1 of the base station. The method can also include providing a compensated phase information of at least one symbol to one or more components at Layer 2 of the base station for decoding of the received signal.

In some implementations, receiving of the signal can also include demodulating the received signal to generate an equalized received signal.

In some implementations, the uplink channel can include at least one of the following: a physical uplink control channel ("PUCCH") and a physical uplink shared channel ("PUSCH"). The method can also include repeating the detecting, the determining and the compensating for each symbol in the constellation, generating a cumulative angular difference based on the repeating, and providing the cumulative angular difference to one or more components at Layer 2 (or any higher layers) of the base station.

In some implementations, the method can also include receiving another signal containing another frame including a plurality of another symbols on the uplink communication channel. One or more of these symbols can be compensated, using one or more components at Layer 1 of the base station, using the generated cumulative angular difference. One or more of such symbols can be adjacent to the expected reference symbol.

In some implementations, the method can further include adjusting the generated cumulative angular difference based on a variation on the uplink communication channel, and performing the detecting, the determining, and the compensating for remaining symbols in the plurality of other symbols.

In some exemplary, non-limiting, implementations, the user equipment can be located on a high speed train.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary base station of the exemplary LTE system shown in FIG. 1a;

DETAILED DESCRIPTION

Figure 1A:
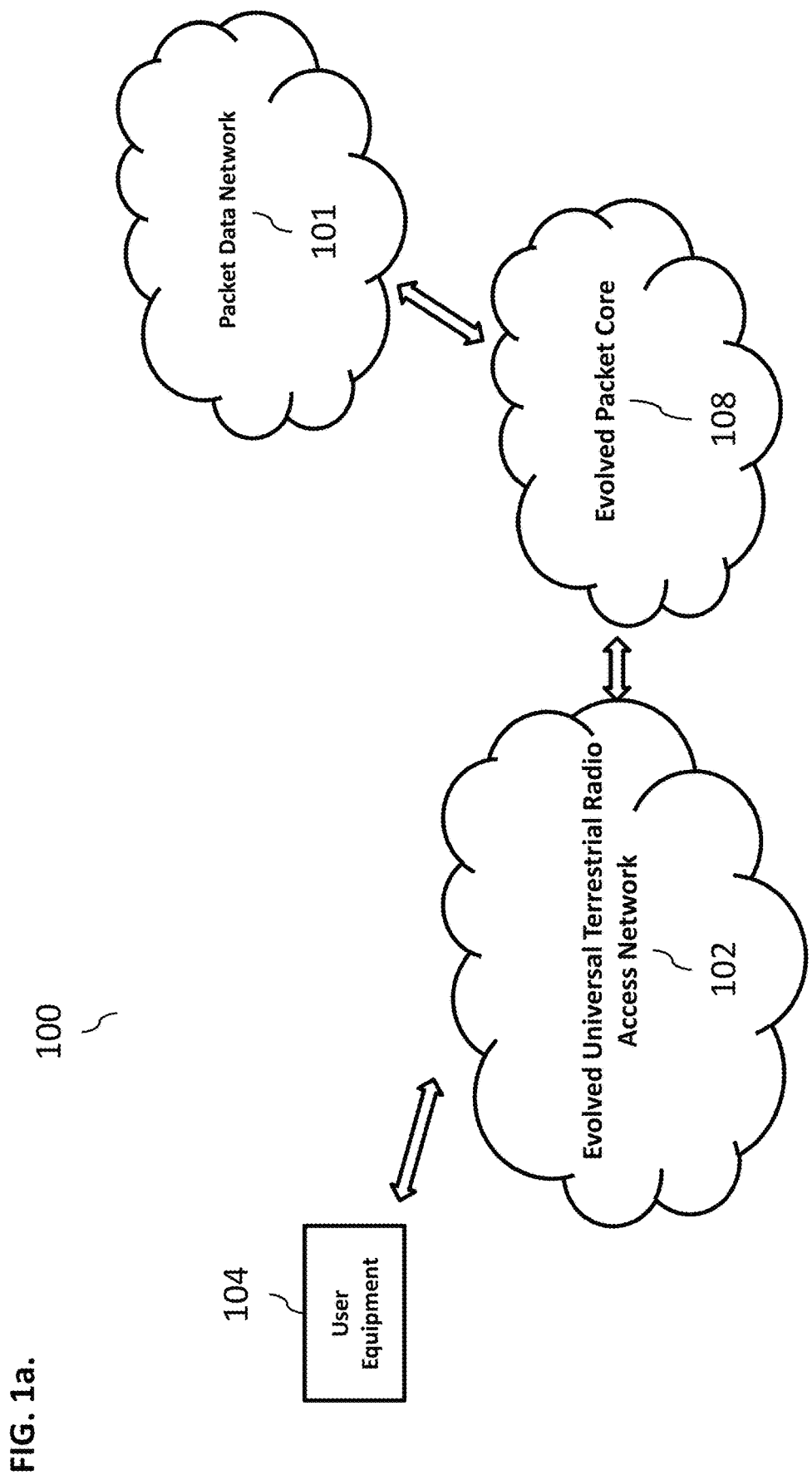
FIG. 1a illustrates an exemplary conventional long term evolution ("LTE") communications system.

To address these and potentially other deficiencies of currently available solutions, one or more implementations of the current subject matter relate to methods, systems, articles of manufacture, and the like that can, among other possible advantages, provide an ability to enhance reception of signals in wireless communications systems.

In some implementations, the current subject matter relates to a computer-implemented method for transmission of data. The method can be performed in connection with physical/data channels. Channel measured on reference signals can be used to equalize data signals on adjacent symbols on one and/or either sides of the reference signal. Rotation of the average received constellation around the expected constellation location can be measured. In an alternate implementations, gain of the channel variation, i.e., a mean constellation radius from the center of the constellation, can be measured and/or tracked across symbols. In some implementations, the rotation of the constellation by the channel variation can be assumed to be within the same quadrant. Then, this constellation can be compensated by the angle (theta) measured. However, it is possible that the channel variation can be greater (and hence, potentially extending beyond the quadrant), whereby part of the received constellation may extend partly beyond the constellation regions. In that regard, the process of measurement of angle and compensation can be repeated one or more times. During the iterative angle measurement process a cumulative angle is maintained. If the angle of rotation is entirely beyond the regions, then an angle greater than a predetermined angle value (e.g., greater than 45° for 4 QAM scheme, greater than 18° for 16 QAM scheme, etc.) will show up as negative of that predetermined angle value-theta and cannot be compensated, as such, it may be assumed that the rotation of the constellation extended into the next quadrant (e.g., in a clockwise or counterclockwise direction) and data may be decoded accordingly (whereby, based on the decoding, a determination may be made that rotation beyond a quadrant has occurred). Next adjacent symbols can be compensated with weighted value of the cumulative angle (since channel varies more further away from the reference signal symbols). A further angle measurement and compensation can be performed and a cumulative angle can be stored. This process can be repeated for all symbols in the slot. This cumulative angle is fed to higher layers. In subsequent decoding of the same user, this cumulative angle can be used by Layer 1 to first compensate the symbols adjacent to the reference signals before performing angle measurement. This can allow to track variation of the Doppler over time, e.g., train speeding up/slowing down (e.g., moving closer to a base station and/or moving away from a base station).

In some implementations, the current subject matter method can be performed in connection with control channels. In control channels the reference signals can be substantially adjacent to each other. The rotation of the channel across symbols can be identified by performing correlation of the estimated channel across the reference signal symbols. In some implementations, additional information (e.g., an ACK/NACK of a downlink transmission) maybe encoded on some of the symbols. This can be handled by using hypothesis/rotation around a constellation, similar to the process discussed above with regard to the data channels. For example, if the content is a binary phase shift keying ("BPSK") constellation, then the correlation between the reference signal channels across the symbols can be disposed around a rotated version of the BPSK constellation. Similarly, same methods can be applicable for the QPSK data content. The angle can be determined based on rotation around the expected constellations. The measured angle can be used to compensate the equalized symbols away from the reference symbols. In some implementations, the measurements can be performed on per user equipment's basis, as some user equipments may require compensation while others do not.

One or more aspects of the current subject matter can be incorporated into transmitter and/or receiver components of base stations in such communications systems. An exemplary long-term evolution communications system is described below. Such systems may include a 4G long term evolution communications system, a 5G New Radio ("NR") communications system, and/or any other communications systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1B:
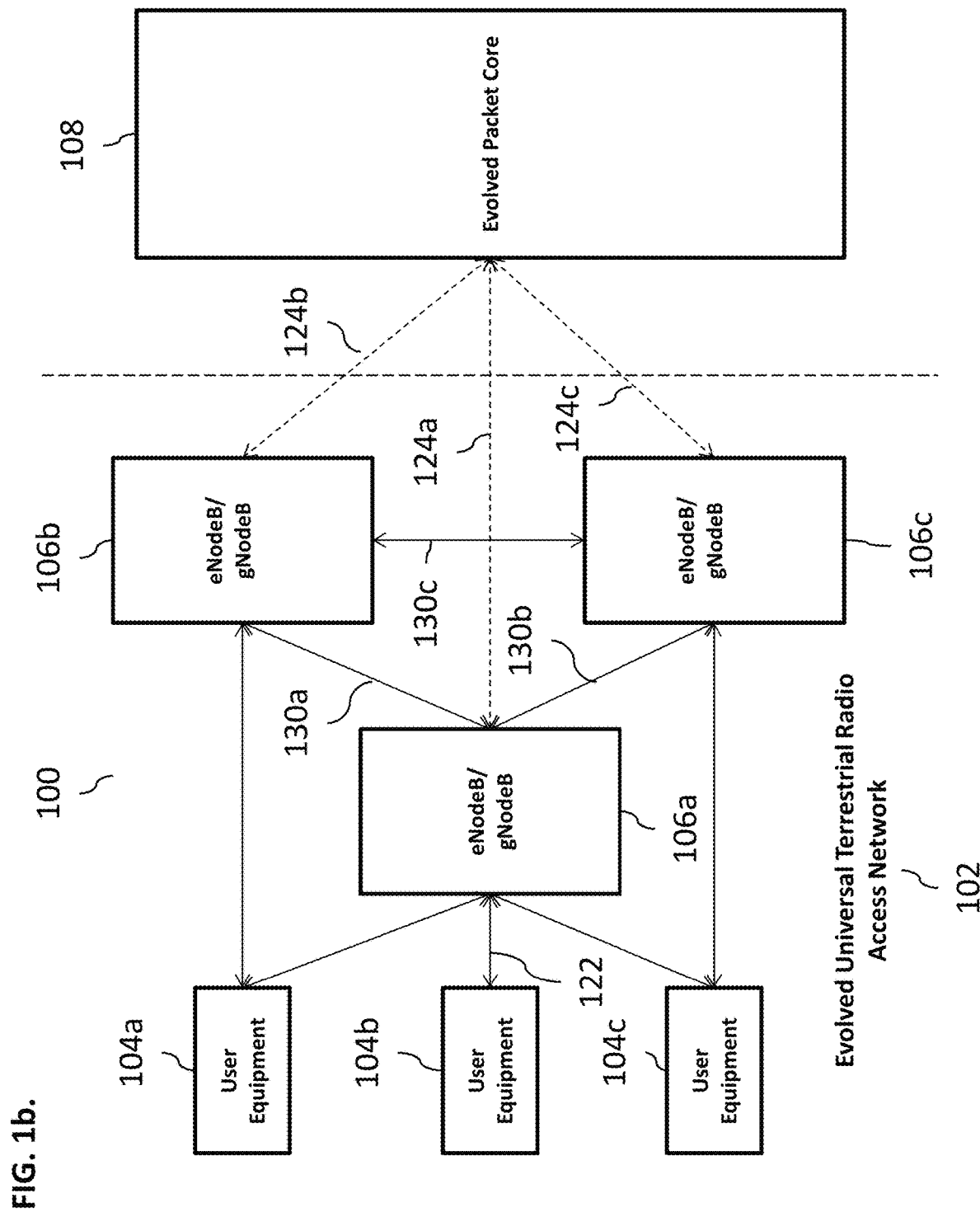

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or gNodeB's or base stations 106 (a, b, c) (as shown in FIG. 1b) that provide communication capabilities to a plurality of user equipment 104(a, b, c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB/gNodeB 106. Typically, the user equipment 104 can connect to the nearest, in terms of distance, eNodeB/gNodeB 106. In the LTE system 100, the EUTRAN 102 and EPC 108 work together to provide connectivity, mobility and services for the user equipment 104.

Figure 1C:
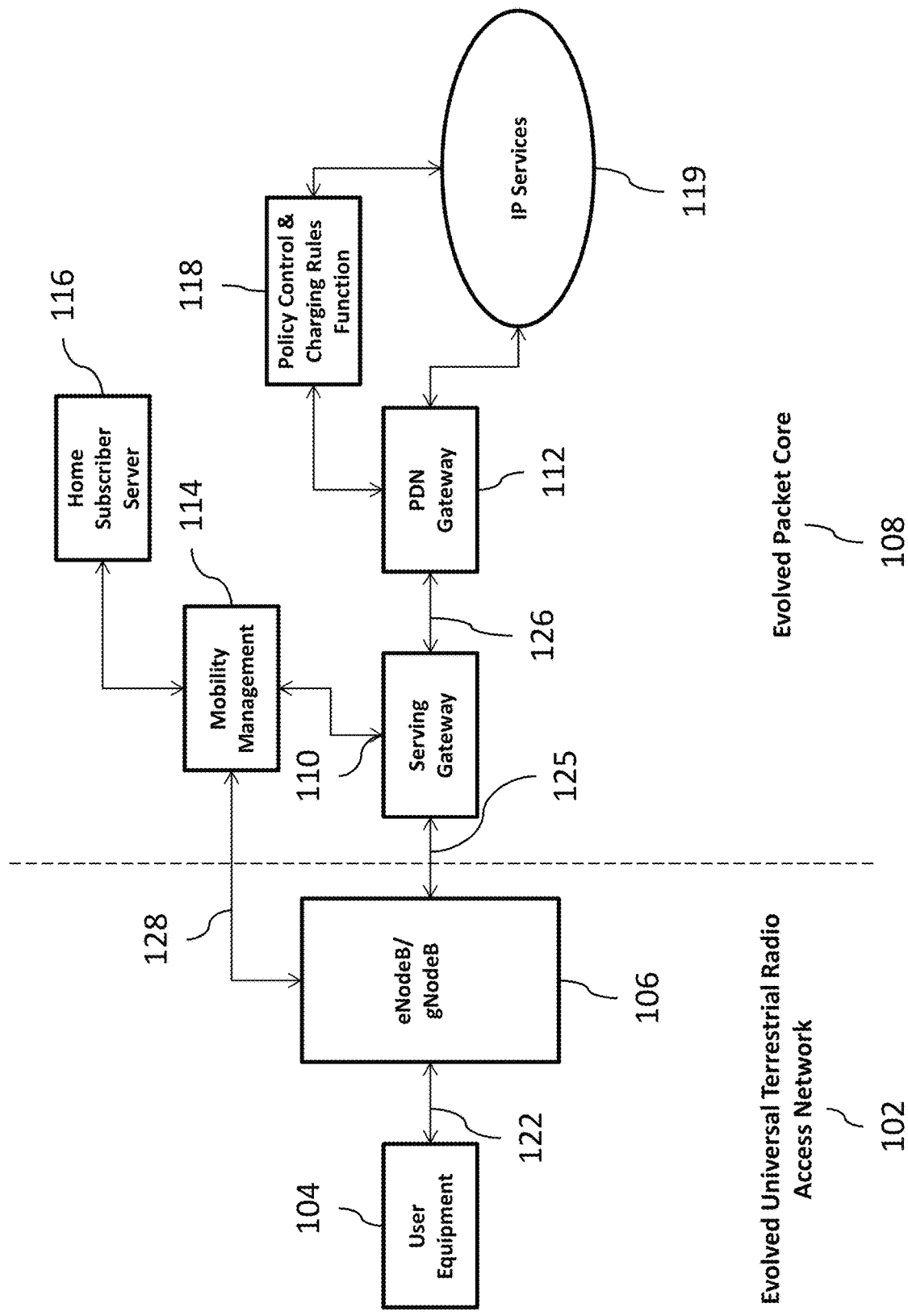

FIG. 1b illustrates further detail of the network 100 shown in FIG. 1a. As stated above, the EUTRAN 102 includes a plurality of eNodeBs/gNodeBs 106, also known as cell sites. The eNodeBs/gNodeBs 106 provides radio functions and performs key control functions including scheduling of air link resources or radio resource management, active mode mobility or handover, and admission control for services. The eNodeBs/gNodeBs 106 are responsible for selecting which mobility management entities (MMES, as shown in FIG. 1c) will serve the user equipment 104 and for protocol features like header compression and encryption. The eNodeBs/gNodeBs 106 that make up an EUTRAN 102 collaborate with one another for radio resource management and handover.

Communication between the user equipment 104 and the eNodeB/gNodeB 106 occurs via an air interface 122 (also known as "LTE-Uu" interface). As shown in FIG. 1b, the air interface 122 provides communication between user equipment 104b and the eNodeB/gNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB/gNodeB 106 and non-access stratum ("NAS") for signaling between the user equipment 104 and MME (as shown in FIG. 1c). In addition to signaling, user traffic is transferred between the user equipment 104 and eNodeB/gNodeB 106. Both signaling and traffic in the system 100 are carried by physical layer ("PHY") channels.

Multiple eNodeBs/gNodeBs 106 can be interconnected with one another using an X2 interface 130(a, b, c). As shown in FIG. 1a, X2 interface 130a provides interconnection between eNodeB/gNodeB 106a and eNodeB/gNodeB 106b; X2 interface 130b provides interconnection between eNodeB/gNodeB 106a and eNodeB/gNodeB 106c; and X2 interface 130c provides interconnection between eNodeB/gNodeB 106b and eNodeB/gNodeB 106c. The X2 interface can be established between two eNodeBs/gNodeBs in order to provide an exchange of signals, which can include a load- or interference-related information as well as handover-related information. The eNodeBs/gNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB/gNodeB 106 to another during mobility operations, the S-GW 110 remains the same and the bearer path towards the EUTRAN 102 is switched to talk to the new eNodeB/gNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB/gNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB/gNodeB 106 from which the user equipment 104 initiates system access. The MME is typically part of a collection of MMES in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

II. Enodeb/Gnodeb

Figure 1D:
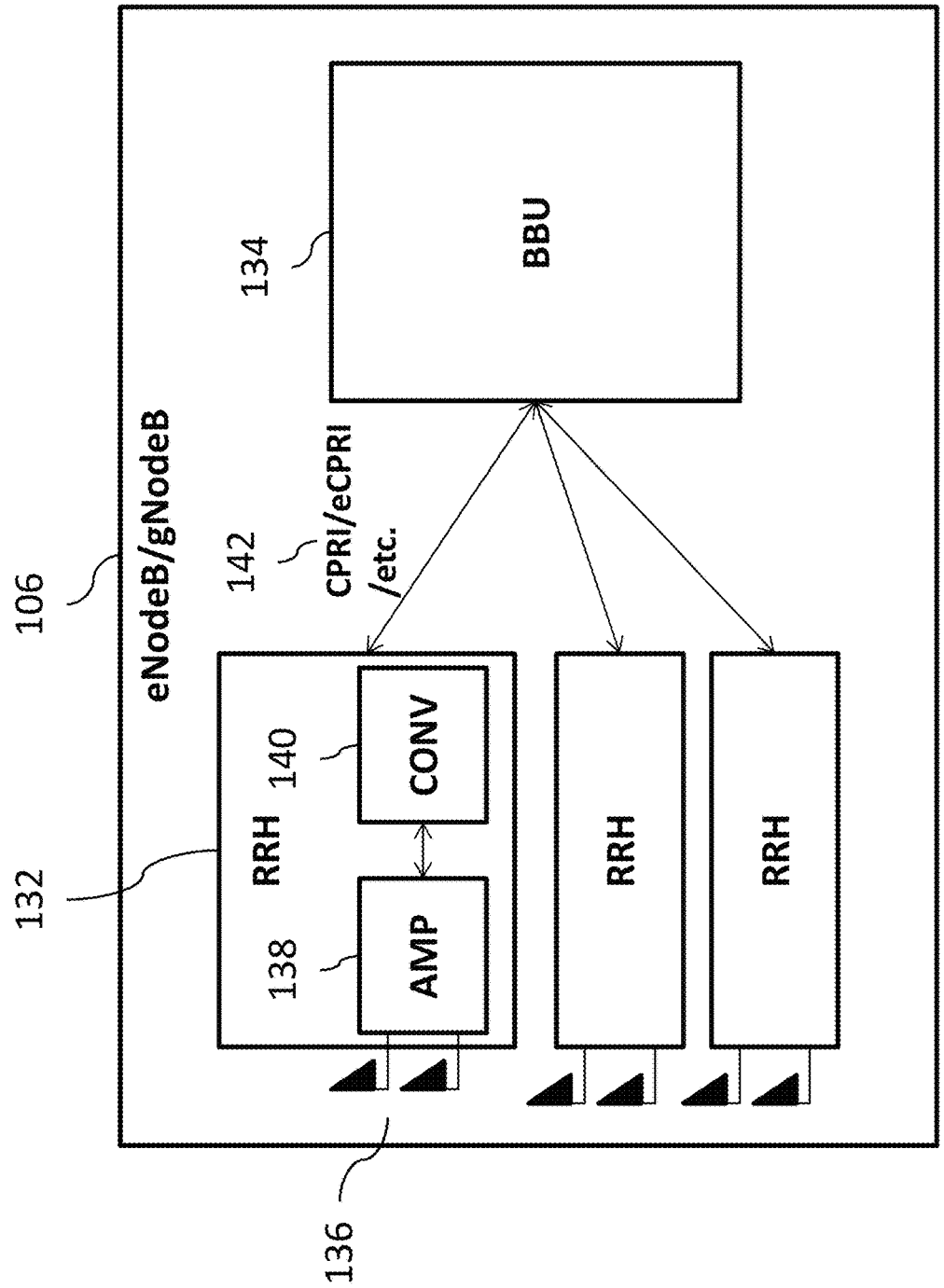

FIG. 1d illustrates an exemplary structure of eNodeB/gNodeB 106. The eNodeB/gNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI"), eCPRI, and/or any other interface (e.g., proprietary interface) 142 standard specification. The operation of the eNodeB/gNodeB 106 can be characterized using at least one of the following standard parameters (and/or specifications): radio frequency band (Band4, Band9, Band17), bandwidth (5, 10, 15, 20 MHz), access scheme (downlink: OFDMA; uplink: SC-OFDMA), 8×8 MIMO and/or massive MIMO and 1×8 or 1×4 receive scheme in the uplink, antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
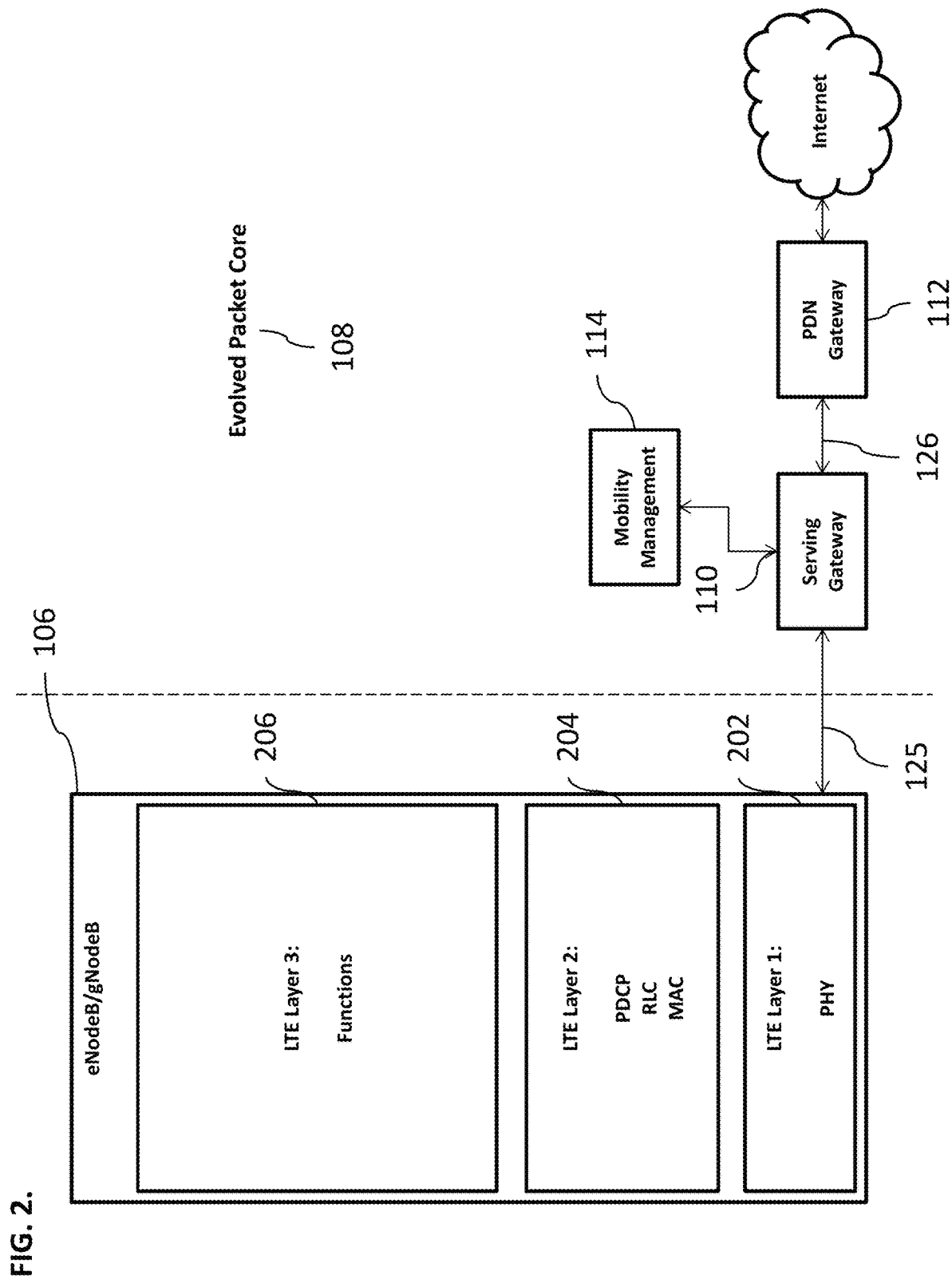
FIG. 2 illustrates further detail of a base station shown in FIGS. 1a-d.
Figure 3:
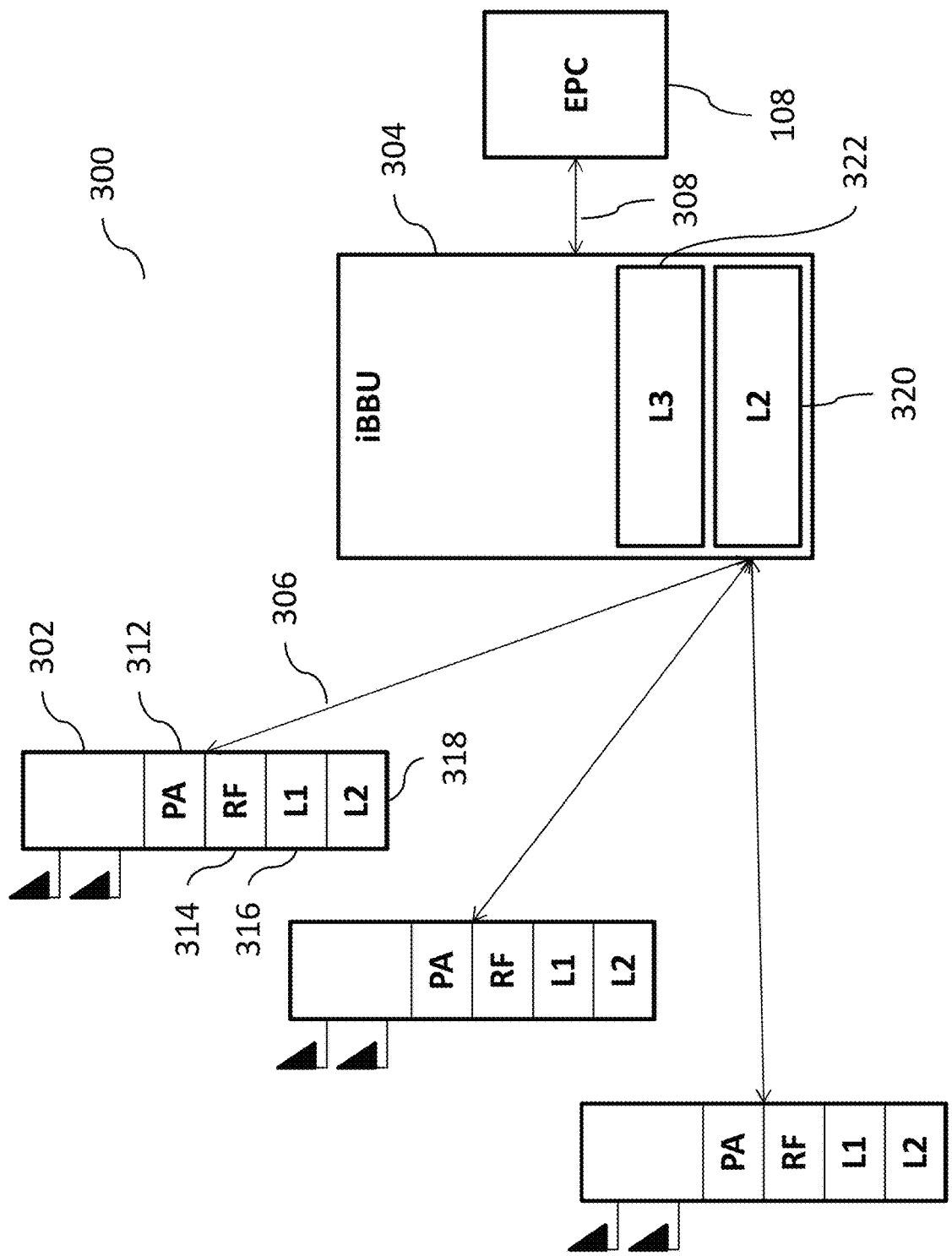
FIG. 3 illustrates an exemplary virtual radio access network, according to some implementations of the current subject matter.

FIG. 2 illustrates an additional detail of an exemplary eNodeB/gNodeB 106. The eNodeB/gNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB/gNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB/gNodeB 106 is radio resource management, which includes scheduling of both uplink and downlink air interface resources for user equipment 104, control of bearer resources, and admission control. The eNodeB/gNodeB 106, as an agent for the EPC 108, is responsible for the transfer of paging messages that are used to locate mobiles when they are idle. The eNodeB/gNodeB 106 also communicates common control channel information over the air, header compression, encryption and decryption of the user data sent over the air, and establishing handover reporting and triggering criteria. As stated above, the eNodeB/gNodeB 106 can collaborate with other eNodeB/gNodeB 106 over the X2 interface for the purposes of handover and interference management. The eNodeBs/gNodeBs 106 communicate with the EPC's MME via the S1-MME interface and to the S-GW with the S1-U interface. Further, the eNodeB/gNodeB 106 exchanges user data with the S-GW over the S1-U interface. The eNodeB/gNodeB 106 and the EPC 108 have a many-to-many relationship to support load sharing and redundancy among MMEs and S-GWs. The eNodeB/gNodeB 106 selects an MME from a group of MMEs so the load can be shared by multiple MMEs to avoid congestion.

III. Enhancement of Reception of Signals in Wireless Communications Systems

In some implementations, the current subject matter relates to an ability to enhance communications, including enhancement of reception of signals, in wireless communications systems. As stated, such exemplary communications systems may include, but are not limited, to 4G LTE communications systems, 5G new radio ("NR") communications system, and/or any other communications systems. The 5G NR communications system is a proposed next telecommunications standard beyond the current 4G/IMT-Advanced communications standards. 5G networks are planned to offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when not Wi-Fi networks. 5G networks are planned to have an improved support of device-to-device communication, lower cost, lower latency than 4G equipment and lower battery consumption, etc. Such networks are planned to have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

High-speed trains and/or other similar extreme speed channel conditions impose difficulties for detection and demodulation of signals in wireless communication systems. In some implementations, the current subject matter can detect and correct for imperfections caused by channel to maintain performance of the system. The current subject matter can identify users who are experiencing extreme channel conditions and perform enhanced reception for demodulation of the signal. Further, the current subject matter can also track variations in channel conditions (e.g., UE moving slowly, moving fast, slowing down, speeding up, moving closer to a base station, moving away from a base station, etc.) and adjust reception treatment accordingly. The current subject matter can also adapt to conditions where some of UEs experience extreme channel conditions while others do not.

The current subject matter can may be applicable to various extreme channel conditions, such as, high speed trains, where base station radio/distributed units may be deployed along the train tracks (e.g., speeds in excess of 350 km/h may present difficulties in decoding the signals as the channel varies very fast across symbols).

Figure 4:
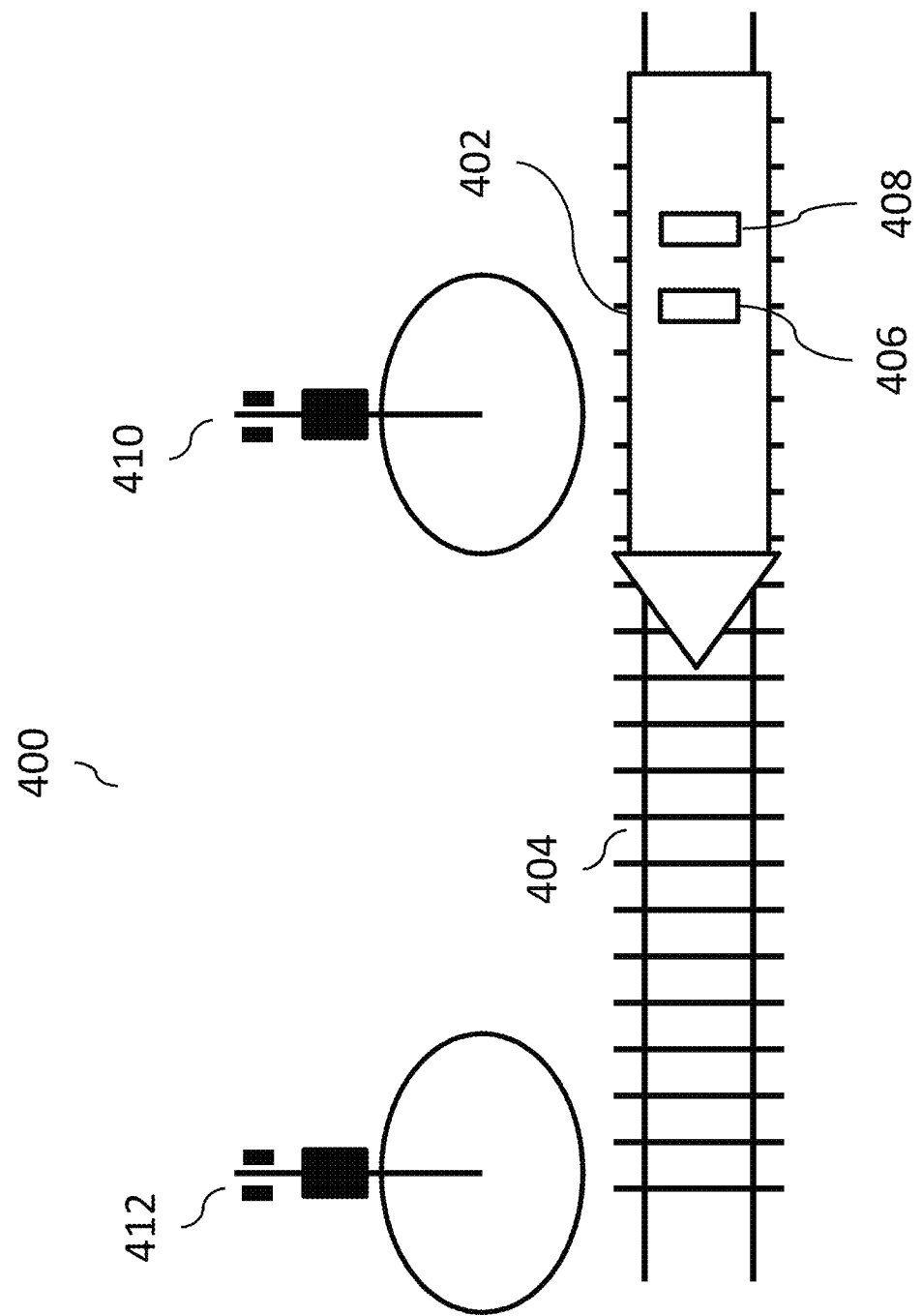
FIG. 4 illustrates an exemplary system for performing enhancement of reception of signals in wireless communications systems, according to some implementations of the current subject matter

FIG. 4 illustrates an exemplary system 400 for performing enhancement of reception of signals in wireless communications systems, according to some implementations of the current subject matter. By way of a non-limiting example, the system 400 may be implemented in high-speed train environment, where one or more user equipments are located aboard a train moving at high speed. As can be understood, the current subject matter system may be implemented in any other type of environment to provide an enhanced reception of signals.

Referring to FIG. 4, the system 400 can implemented in an extreme channel conditions that can include, for example, a high-speed train 402 traveling along train tracks 404, one or more communication nodes 410, 412 (e.g., eNodeBs/eNodeBs/etc.) that may be positioned along train tracks (and/or at any other location), and one or more user equipments 406, 408 that may be located on the train 402 and may be attempting to communicate with one or more nodes 410, 412. The train 402 may be travelling at high-speeds (e.g., in excess of 350 km/h), travelling at reduced speeds, and/or may be stopping at one or more train stations. Such movement may affect reception and/or transmission of signals between one or more user equipments 406, 408 and one or more nodes 410, 412. Such extreme channel conditions may impose difficulties in detecting and/or demodulating of signals.

The current subject matter may be configured to identify one or more user equipments 406, 408 that may be experiencing extreme channel conditions and may perform enhanced demodulation of signals in accordance with an exemplary scheme discussed below. Further, the current subject matter may continue to monitor user equipments for variations in channel conditions (e.g., moving at high speeds, reduced speeds, stopping at train stations, etc.) and apply enhanced demodulation accordingly. Moreover, the current subject matter may be configured to distinguish between user equipments 406, 408 that may experience extreme channel conditions and those that do not and treat them differently in accordance with the enhanced demodulation scheme.

Figure 7:
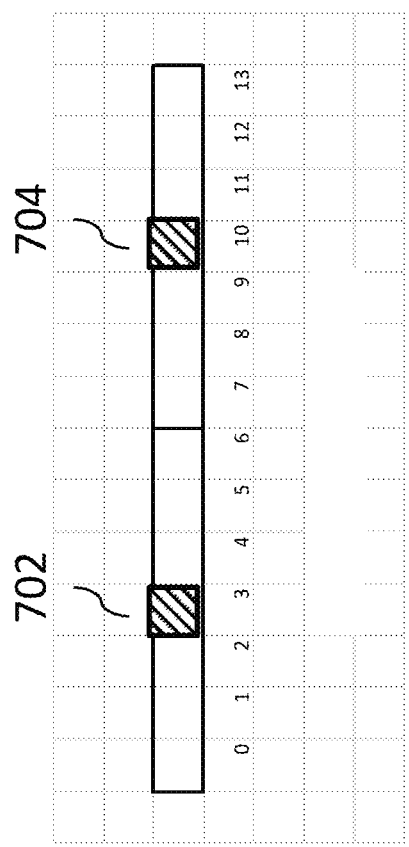
FIG. 7 illustrates an exemplary sub-frame/slot structure with reference signal for uplink shared channel/data channels, according to some implementations of the current subject matter.
Figure 8:
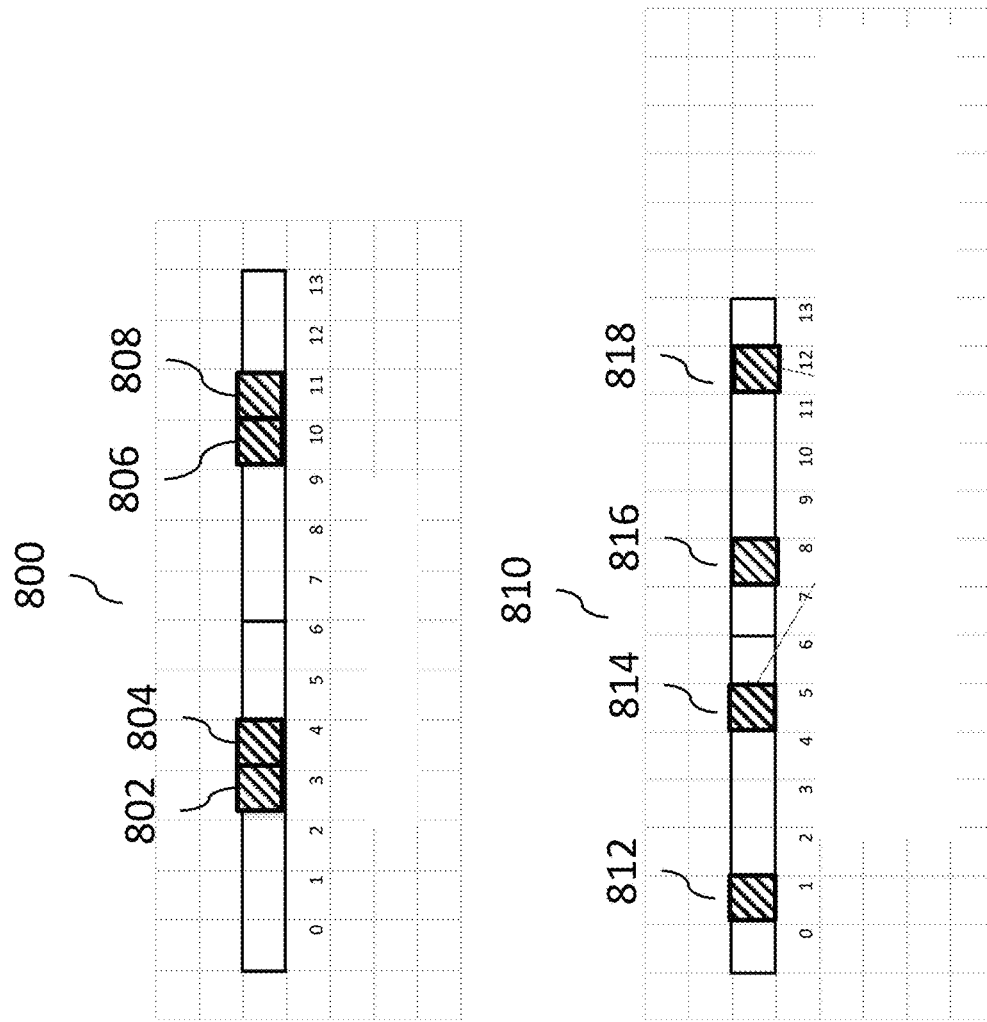
FIG. 8 illustrates an exemplary sub-frame/slot structure with reference signal for uplink control channel, according to some implementations of the current subject matter.

In typical wireless standards (LTE/NR/WIF/WiMAX), reference signals or pilot signals can be provided to measure channel and use that channel for the demodulation process. FIG. 7 illustrates an exemplary sub-frame/slot structure 700 that can include reference or pilot signals 702, 704 for an uplink shared channel/data channels. FIG. 8 illustrates an exemplary sub-frame/slot structures 800 and 810 for uplink control channels. Structure 800 can include reference signals 802, 804, 806, and 808, where signals 802 and 804 are adjacent to each other (similarly, signals 806, 808), as is common in control channels. Structure 810 can include reference signals 812, 816 and can also be encoded with ACK/NACK of a downlink transmissions (as transmitted on uplink channels) 814, 818.

The demodulation process can involve using the measured channel to "equalize" the received data signals. When the channel varies very quickly across the symbols, then the equalized symbols can be distorted, as shown in FIG. 5a.

Figure 5A:
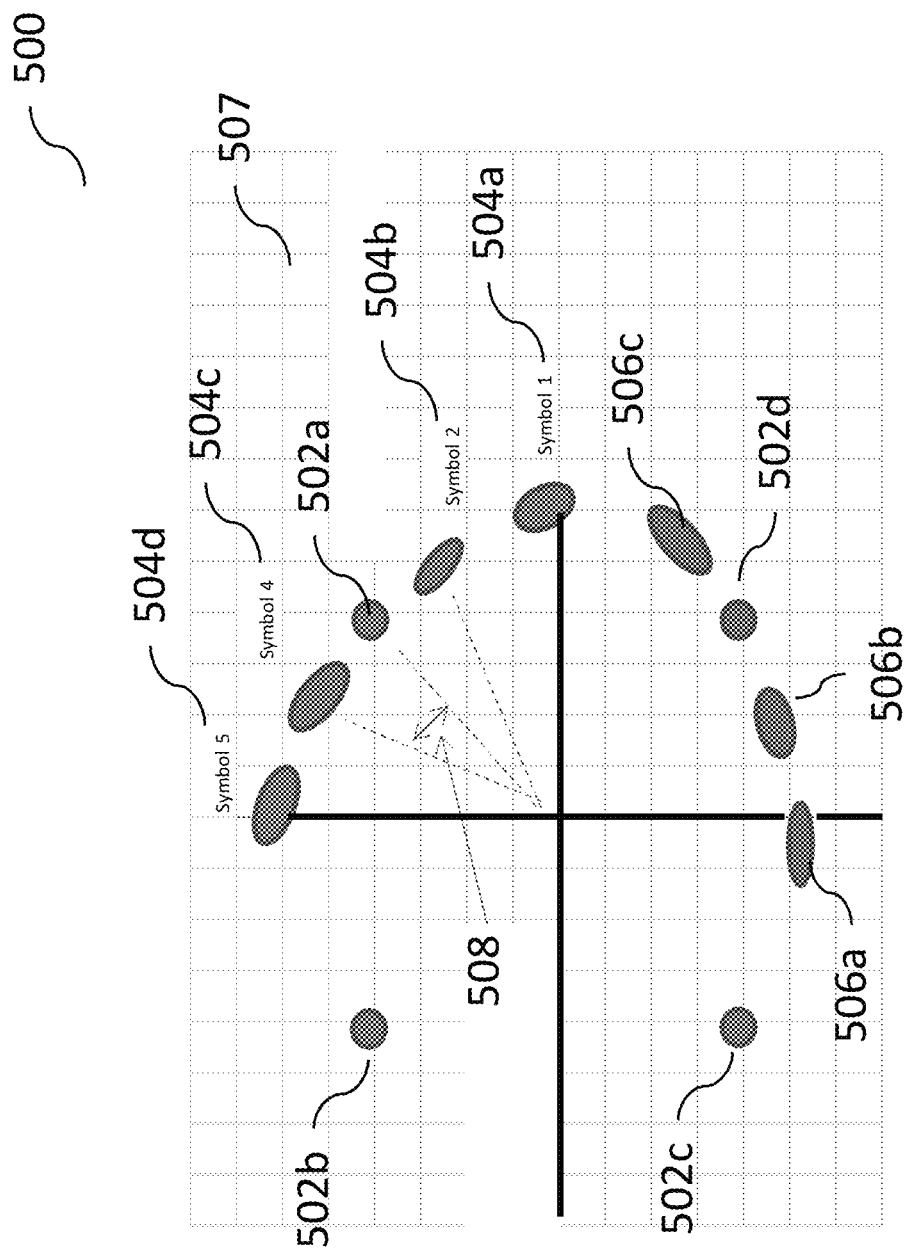
FIGS. 5a-b illustrate exemplary constellation diagrams, according to some implementations of the current subject matter.

FIG. 5a illustrates an exemplary constellation diagram 500. A constellation diagram can be a representation of a signal modulated by a modulation scheme, e.g., quadrature amplitude modulation (QAM) or phase-shift keying (PSK). The diagram shows a signal as a two-dimensional xy-plane scatter diagram in a complex plane at symbol sampling times. A point in the diagram is characterized by an angle measured counterclockwise from the x-axis and a distance from the origin. The angle corresponds to a phase shift of a carrier wave from a reference phase and the distance corresponds to a measure of an amplitude or power of the signal. As information is transmitted as a series of samples (each occupies a uniform time slot), each sample encodes one of a finite number of "symbols" representing one or more bits of information. Each symbol is encoded as a different combination of amplitude and phase of the carrier and is represented by a constellation point on the constellation diagram that shows all possible symbols transmitted by the system. In the constellation diagram, the points lie on a circle around the origin.

In an ideal world, the constellation diagram would shows correct positions of each point representing each symbol. However, after passing through a communication channel or in an extreme channel conditions, various factors (e.g., noise, distortion, speed, etc.) affect an amplitude and phase received by a demodulator and may differ from the correct values for the symbols. As such, when the points are plotted on a constellation diagram, the points representing each received sample may be offset from their correct positions for the symbols. A detector (e.g., a vector signal analyzer) may be configured to determine positions of each received symbol and plot it as a point around the reference signal.

As shown in FIG. 5a, the correct positions of symbols or expected positions constellation positions after equalization may be represented by points 502 (a, b, c, d). However, because of extreme channel conditions, the received symbols 1, 2, 4, 5 504 (a, b, c, d) may be plotted around the reference point 502a. Similarly, symbols 506 (a, b, c) may be plotted around reference point 502d in the lower right quadrant of the constellation diagram 500. Other received symbols (not shown in FIG. 5a) may be plotted around other reference points 502 at their respective locations. In some implementations, the current subject matter may include a detector (not shown in FIG. 5a) that may be incorporated into one or more nodes 410, 412 (and/or anywhere else in the system 400) that may be configured to measure an angle 508 between the reference point 502a and the position of the received symbol 504c, where the angle 508 may correspond to the change in phase/amplitude and may be used in determination of adjustment that may be required to enhance reception of a signal.

In some implementations, as stated above, the current subject matter can identify user equipments that may be experiencing extreme channel changes or conditions (e.g., high speed/high Doppler channels). User equipments experiencing such conditions may correspond to symbols 504 (a, b, c, d), as shown in FIG. 5a. The user equipments may be identified, for example, during an attach procedure's transmission of initial uplink messages (e.g., in LTE/NR systems—Message 3). As can be understood, the users may be identified during any period of time (e.g., while signals are being transmitted). The current subject matter may be configured to measure channel variation. One or more components at Layer 1 in the node 410, 412 (e.g., a base station) may be configured to perform measurement of channel variation and provide this information to one or more components at Layer 2 (and/or higher layers). The Layer 2 (and/or higher layers) components may be further configured to use the provided information for the purposes of decoding one or more subsequent uplink signals. Further, every slot/time transmission interval (TTI) allocation of a user equipment (which can refer to the allocation that can include a data channel and/or a control channel) can be determined and, based on that determination, the user equipment can be identified as experiencing extreme channel conditions (e.g., travelling in a high speed state) or not. When a user equipment is identified as experiences extreme channel conditions, then the angle 508 (as shown in FIG. 5a) can be used for compensation of the equalized symbols.

Figure 5B:
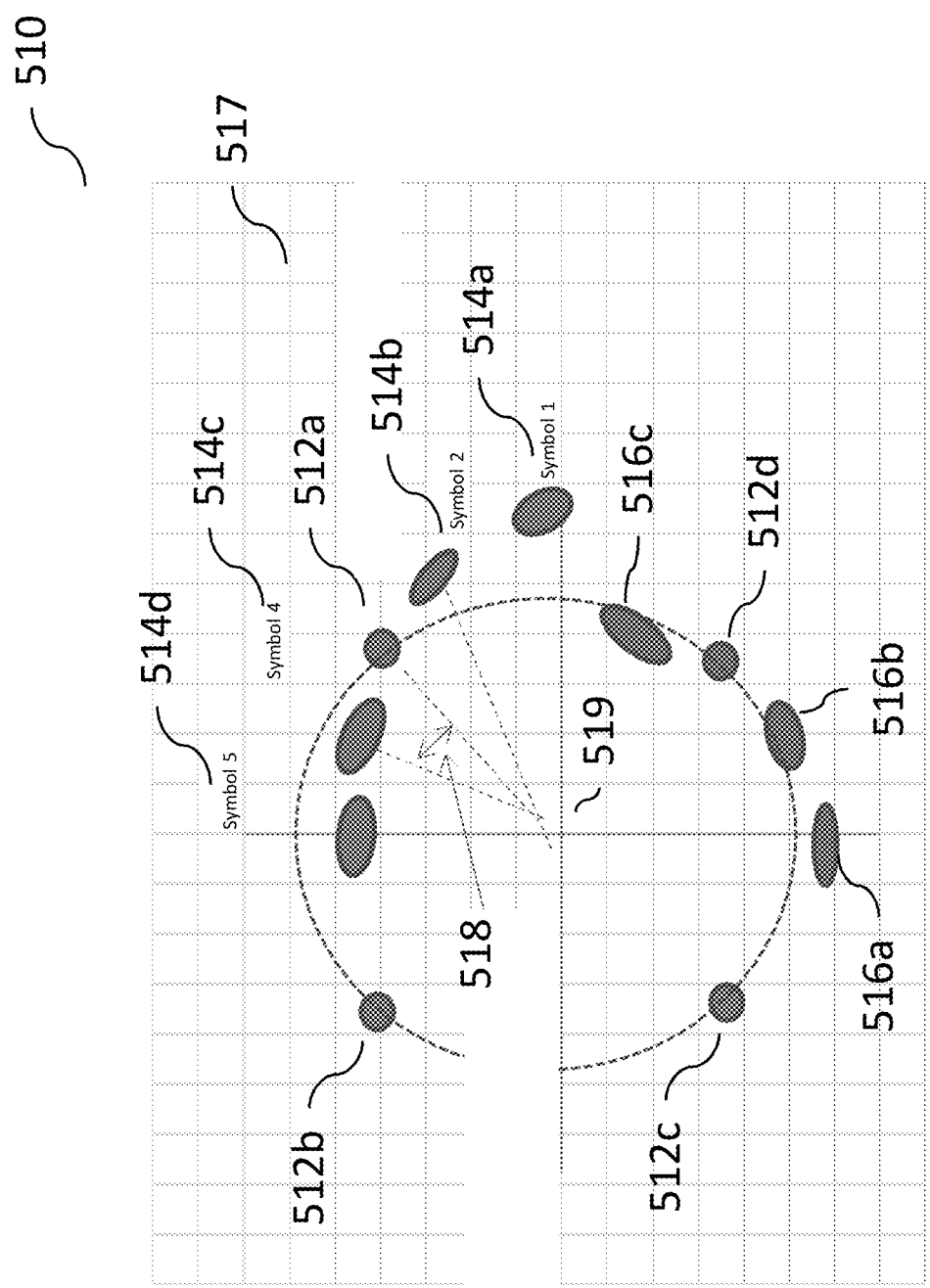

FIG. 5b illustrates an exemplary constellation diagram 510 that shows gain of channel variation measurement. Similar to FIG. 5a, the correct positions of symbols or expected positions constellation positions after equalization may be represented by points 512 (a, b, c, d). However, because of extreme channel conditions, the received symbols 1, 2, 4, 5 514 (a, b, c, d) may be plotted around the reference point 512a in the upper right quadrant or quadrant I. Similarly, symbols 516 (a, b, c) may be plotted around reference point 512d in the lower right quadrant or quadrant IV of the constellation diagram 500. Other received symbols (not shown in FIG. 5b) may be similarly plotted around other reference points 512 at their respective locations. In some implementations, a detector (not shown in FIG. 5b) in one or more nodes 410, 412 may be configured to measure an angle 518 between the reference point 512a and the position of the received symbol 514c, where the angle 518 may correspond to the change in phase/amplitude and may be used in determination of adjustment that may be required to enhance reception of a signal.

In some implementations, as stated above, the current subject matter can identify user equipments that may be experiencing extreme channel changes or conditions (e.g., high speed/high Doppler channels). User equipments experiencing such conditions may correspond to symbols 514, as shown in FIG. 5b. Further, the current subject matter may be configured to perform determination and tracking of gain of channel variation. This can correspond to a radius from the center 519 of the constellation to the location of the symbol 514, for example. As shown in FIG. 5b, the radius of symbol 514c is smaller than the radium of symbol 514b. An average of such radii may be representative of the gain in channel variation, which may be used for the purposes of enhancing reception of signals.

Similar to FIG. 5a, one or more components at Layer 1 in the nodes 410, 412 may perform measurement of channel variation/gain and provide this information to one or more components at Layer 2 (and/or higher layers), which, in turn, may use the provided information to decode one or more subsequent uplink signals. Further, every slot/time transmission interval (TTI) allocation of a user equipment (which can refer to the allocation that can include a data channel and/or a control channel) can be determined and, based on that determination, the user equipment can be identified as experiencing extreme channel conditions (e.g., travelling in a high speed state) or not. When a user equipment is identified as experiencing extreme channel conditions, then the angle 518 (as shown in FIG. 5a) can be used for compensation of the equalized symbols.

Figure 6:
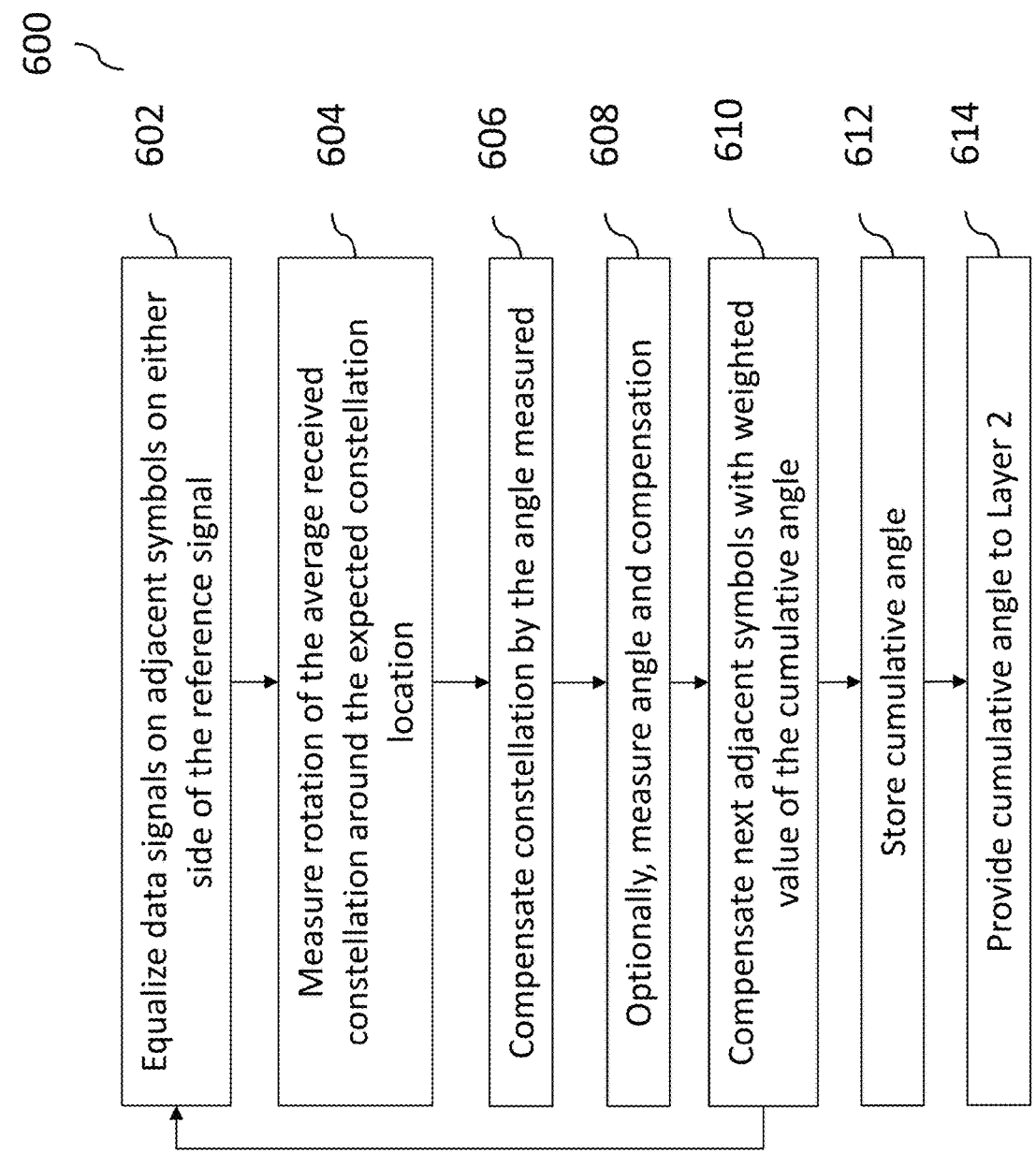
FIG. 6 illustrates an exemplary process for performing enhancement of reception of signals in a wireless communication system, according to some implementations of the current subject matter.

FIG. 6 illustrates an exemplary process 600 for performing enhancement of reception of signals in a wireless communication system, according to some implementations of the current subject matter. The method 600 may be executed by one or more nodes 410, 412 of system 400 and may be performed in connection with physical/data channels. In some exemplary implementations, the process 600 may be configured to perform phase correction (in accordance with an algorithm described below) of symbols for the purposes providing an enhanced reception of signals.

In some implementations, the process 600 may initiated with the assumption that a symbol is located in a particular quadrant where angle measurement can be performed without any further rotation of the constellation (e.g., quadrant I, quadrant II, quadrant III, or quadrant IV of the constellation). At 602, channel measurement can be performed by one or more components of Layer 1 of one or more nodes 410, 412 (shown in FIG. 4). The measurement can be executed during an initial attach procedure, for example. The measurement can be performed using reference symbols (e.g., signal 502a/512a as shown in FIGS. 5a-b) and can be used to equalize data signals on adjacent symbols (e.g., symbols 504c/514c and 504b/514b) on either side of the reference signal.

At 604, rotation of the average received constellation point around the expected constellation point can be also measured (e.g., corresponding to angles 508/518 shown in FIGS. 5a-b). In some implementations, the rotation of the constellation by the channel variation can be assumed to be within the same quadrant (e.g., quadrant 507/517).

At 606, the measured angle (θ) 508/518 can be used to compensate the symbols in the constellation. However, it is possible that the channel variation can be greater and thus potentially extending beyond the quadrant, whereby part of the received constellation may be extending beyond the constellation regions (e.g., symbol 504a/514a may be potentially extending outside of quadrant 507/517 shown in FIGS. 5a-b). As such, the process of measuring the angle and performing compensation can be repeated one or more times (e.g., 2 times), at 608.

During the iterative angle measurement/compensation process, a cumulative angle can be determined. If the determined angle of rotation extends beyond the quadrant, then an angle θ greater than a predetermined value of an angle which crosses over to another quadrant for a particular QAM (e.g., 4 QAM, 16 QAM, 64 QAM, etc.) scheme (e.g., greater than 45° for 4 QAM scheme, greater than 18° for 16 QAM scheme, etc.) may be determined by one or more components at Layer 1 as negative of that predetermined value of the angle (e.g., a predetermined angle value (e.g., 45°, 18°, etc.)) and additional compensation might not be possible. In that case, an assumption (e.g., a hypothesis) may be made that the angle θ greater than the predetermined value of the angle (e.g., 45°, 18°, etc.) and then, rotation of the constellation by the predetermined value of the angle (e.g., 45°, 18°, etc.) with subsequent angle measurement may be performed. If the angle is now less than the predetermined value of the angle (e.g., 45°, 18°, etc.), compensation may be executed. Otherwise, further rotation may be performed. In some implementations, rotation may be performed by π/4, −π/4, π/2, −π/2, etc. Further, this procedure may be performed only once, e.g., during an initial attach procedure. At that time, a payload of any data packets may be relatively small, and thus, multiple attempts may be made to ensure that rotation is within the quadrant where measurement of the angle may be performed. Further, once a quadrant containing a particular symbol is identified, any subsequent angle measurements (on per user equipment's basis) may be performed taking into account the previously determined additional rotation value (e.g., π/4+θ, etc.). At 610, next adjacent symbols can be compensated with weighted value of the determined cumulative angle (since channel varies further away from the reference signals symbol). In some exemplary, non-limiting implementations, the weighting factor may be [0.5, 0.5] across symbols. As can be understood, any other weighting factors may be used. The processing may come back to 602 if an angle cannot be determined (e.g., a cyclic redundancy check (CRC) has failed).

A further angle measurement and compensation can be performed and a cumulative angle can be determined and stored, at 612. This process can be repeated by one or more components at Layer 1 for all symbols in the slot. Once all symbols in the slot have been evaluated and a cumulative angle is determined, the cumulative angle information can be provided to one or more components at Layer 2 (or any higher layers), at 614. In any subsequent decoding signals received from the same user equipment, the determined cumulative angle can be used by one or more components at Layer 1 to compensate symbols adjacent to the reference signals before executing further angle measurement. This can allow to track variation of the Doppler signal information over time, e.g., train speeding up/slowing down (e.g., variation of channel condition may change with increase/decrease of speeds and hence, angles may differ for symbols corresponding to subsequent signals).

In some exemplary, non-limiting implementations, the following algorithm can be used to estimate and compensate phase errors across symbols in accordance with the discussion above. The algorithm can be initiated by estimating phase error(s) across symbols on a physical uplink control channel ("PUCCH") and quadrature phase shift keying ("QPSK") based physical uplink shared channel ("PUSCH") allocations.

To estimate phase error(s) on a control channel, various PUCCH formats (i.e., LTE specification PUCCH formats 1, 1a, 1b, 2, 2a, 2b corresponding to different modulation indexes and number of bits per subframe) may be considered. For example, different PUCCH format allocations can have multiple OFDM symbols carrying reference signals. The channel estimated on these symbols can be correlated and the angle of the resultant complex value can be used to determine phase error(s) across a number of OFDM symbols that the pilots are apart. For example, for PUCCH format 2x, symbols 1 and 5 can be pilots and the phase error can be determined as follows:

$$Error_{phase} = \frac{\text{angle}(h1 * conj(h5))}{3} \quad (1)$$

where h1 and h5 are channels estimated on two pilot symbols 1 and 5.

By way of an additional example, for PUCCH format 1x, symbols 2, 3 and 4 can be pilots and the phase error can be determined as follows $$Error_{phase} = \frac{\text{angle}(h2 * conj(h3)) + \text{angle}(h3 * conj(h4))}{2} \quad (2)$$

where h2, h3 and h4 are channels estimated on the three pilot symbols.

When a PUSCH protocol data unit ("PDU") (e.g., having QPSK modulation, 16 QAM modulation, etc.) is received, the phase error on PUSCH can be determined using the following method. Initially, all equalized QPSK symbols (or any QAM symbols (e.g., 16 QAM, etc.)) can be shifted to the first quadrant (e.g., quadrant 507 shown in FIG. 5*a*) in the constellation by applying a phase shift of $\pi/4$, $\pi/2$, $3\pi/4$, $\pi$, $-\pi/4$, $-\pi/2-3\pi/4$, and/or $-\pi$ radians to symbols in 2nd, 3rd and 4th quadrants (e.g., symbols 506 (*a, b, c*) shown in FIG. 5*a* (symbols in second and third quadrants are not shown in FIG. 5*a*), respectively. Then, the current subject matter system can determine an average phase for all QPSK/QAM symbols that have been shifted to the first quadrant 507. Using the determined average phase, a phase error can be determined as the difference between the average phase and $\pi/4$ radians (such as for QPSK; for 16 QAM, a hypothetical center point may be generated (e.g., a center of four points inside the quadrant) and compared to $\pi/4$).

In some exemplary implementations, for a PUCCH format 2 transmission (e.g., in $5^{th}$ subframe of every radio frame), phase correction may be performed in accordance with the following method. Initially, compensation of phase(s) of all equalized symbols can be performed using phase error can be determined on PUCCH allocation (as discussed above). If attach procedure's MSG 3 PUSCH PDU is received, phase error might not be available from the PUCCH allocation and, thus, phase error can be determined on PUSCH allocation. After compensation is performed in the initial step, residual phase error can be re-estimated using equalized QPSK symbols in the received PUSCH PDU. Then, phase(s) of all equalized symbols can be compensated by using the residual phase error determined on PUSCH allocation.

As stated above, the phase error can be determined on both PUCCH and PUSCH allocations by one or more components of Layer 1 in a node (e.g., eNodeBs 410, 412 shown in FIG. 4) and provided to one or more components of Layer 2 (or any higher layers). As part of uplink configuration ("UL Config") command, one or more components of Layer 1 can receive a previously determined phase error ($\theta1$) of every scheduled user equipment from Layer 2. Then, on PUSCH allocations, a phase compensation can be performed using previously determined phase error ($\theta1$) received from Layer 2. Residual phase error (i.e., $\delta\theta$) can be determined using the compensated QAM symbols from the initial compensation round that used previous values of phase error. The overall phase error can then be determined as $\theta=\theta1+\delta\theta$ and can be provided back to one or more components at Layer 2. On PUCCH allocations, phase error ($\theta$) can be determined in accordance with the discussion above and provided to one or more components at Layer 2.

Exemplary Experimental Implementation

In some exemplary, non-limiting, implementations, standard message passing interface (MPI) between Layer 1 and Layer 2 may include one or more of the following structures and/or messages to provide information concerning phase errors. In particular, various configuration messages that can be transmitted from Layer 2 to Layer 1 can include various additional fields indicative of phase error determination/compensation. Specifically, the PHY_SET_CONFIG message transmitted from Layer 2 to Layer 1 can include EnbMpiSetConfigReq structure having an hstRxMode field (e.g., "hst" corresponding to "high speed train") that may contain information pertaining to the following receiver modes: "0"—receiver is disabled; "1"—"statistics" mode (whereby one or more components at Layer 1 can determine a phase error and provided to one or more components at Layer 2); and "2"—full receiver mode (whereby one or more components at Layer 1 can perform determination and compensation of the phase error). The UI_CONFIG message transmitted from Layer 2 to Layer 1 may include UIPduCfg structure having a mac2phyHstPhaseErr field (where "mac" refers to "medium access control" sublayer of Layer 2; and "phy" refers to physical Layer 1) is added that may be indicative of a phase error per OFDM symbol (e.g., because of a high Doppler).

Notification messages (e.g., HARQ, CQI, PUSCH_DECODE, etc.) that can be transmitted from Layer 1 to Layer 2 can also include additional fields relating to phase error determination. Specifically, the SCHED_HARQ_NOTIFY message transmitted can include UlHiPduDesc structure; SCHED_CQI_NOTIFY message can include the DlCqiRiPduDesc structure; and SCHED_PUSCH_DECODE_NOTIFY message can include the EnbMpi-UlschPduInd structure, all of which can include a phy2MacHstPhaseErr field added that can be indicative of a phase error per OFDM symbol (e.g., because of a high Doppler).

Figure 9:
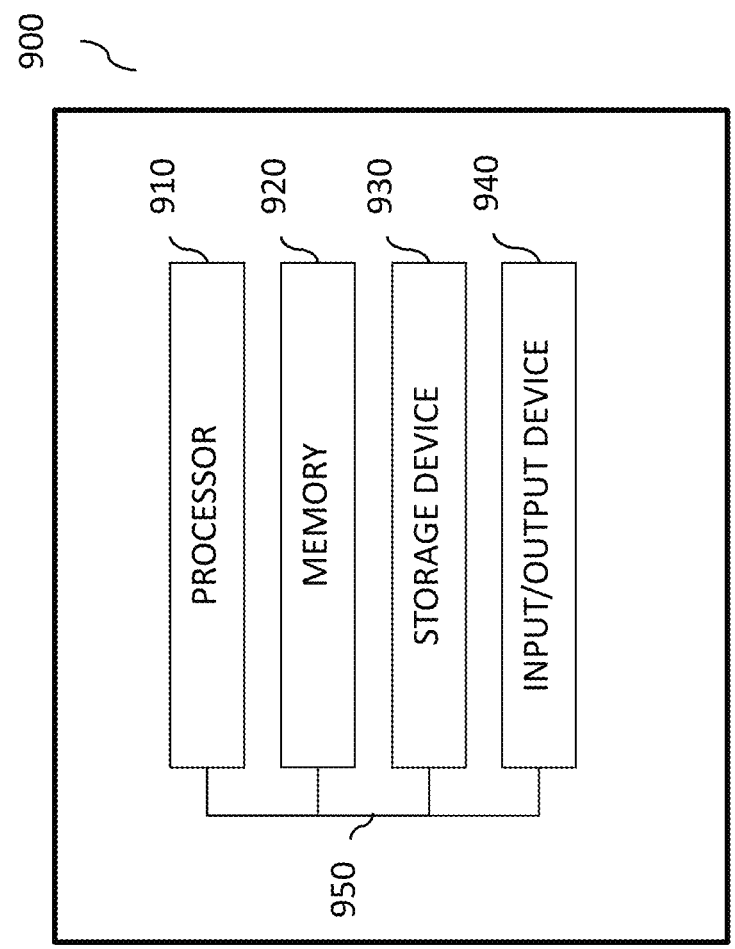
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930 and 940 can be interconnected using a system bus 950. The processor 910 can be configured to process instructions for execution within the system 600. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
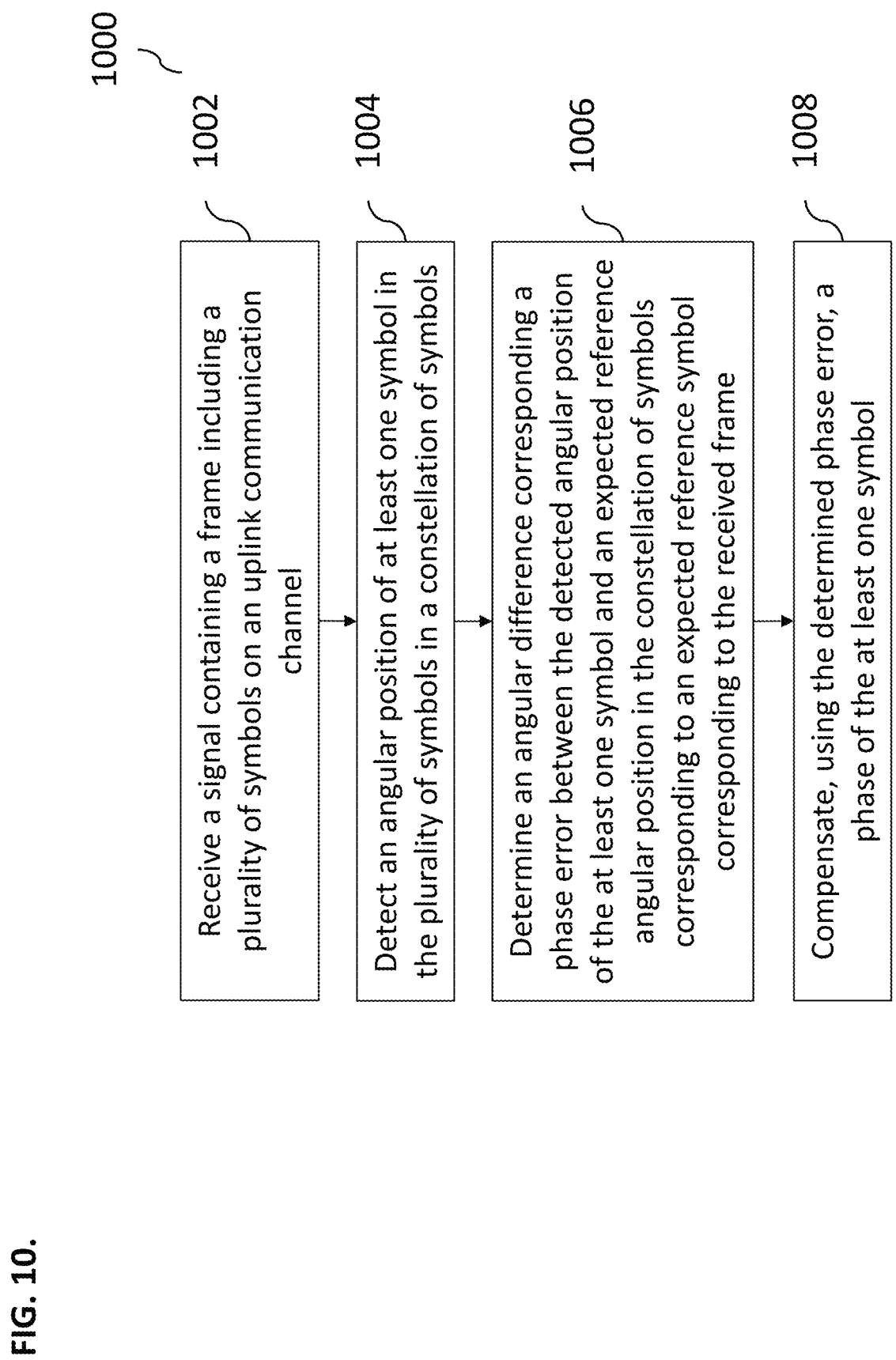
FIG. 10 illustrates an exemplary method, according to some implementations of the current subject matter.

FIG. 10 illustrates an exemplary computer-implemented method 1000 for enhancing reception of signals in a wireless communication system, according to some implementations of the current subject matter. At 1002, a signal containing a frame (e.g., frame 700 as shown in FIG. 7) can be received on an uplink communication channel. The frame can include a plurality of symbols. At 1004, an angular position of at least one symbol in the plurality of symbols can be detected in a constellation of symbols (e.g., constellations 500, 510 as shown in FIGS. 5*a-b*). The position can be detected by one or more components at Layer 1 of a base station (e.g., eNodeB, gNodeB, etc.). The symbols can be equalized symbols, as discussed above. At 1006, an angular difference that can correspond to a phase error between the detected angular position of the at least one symbol and an expected reference angular position in the constellation of symbols corresponding to an expected reference symbol (e.g., symbol 502/512 shown in FIGS. 5*a-b*) corresponding to the received frame can be determined. At 1008, using the determined phase error, a phase of the at least one symbol can be compensated accordingly.

In some implementations, in control channels the reference signals can be substantially adjacent to each other. Thus, the rotation of the channel across symbols can be identified by performing correlation of the estimated channel across the reference signal symbols. In some implementations, additional information (e.g., an ACK/NACK of a downlink transmission, as shown in FIG. 8) maybe encoded on some of the symbols. This can be handled by using hypothesis/rotation around a constellation, similar to the process discussed above with regard to the data channels. For example, if the content is a BPSK constellation, then the correlation between the reference signal channels across the symbols can be disposed around a rotated version of the BPSK constellation. Similarly, same methods can be applicable for the QPSK data content. The angle can be determined based on rotation around the expected constellations and the measured angle can be used to compensate the equalized symbols away from the reference symbols.

In some implementations, the current subject matter can include one or more of the following optional features. In some implementations, at least one of the receiving, the detecting, the determining, and the compensating can be performed by a base station having at least one processor communicatively coupled to at least one memory. The base station can further include a radio transmitter and a radio receiver. The base station can include at least one of the following: an eNodeB base station, a gNodeB base station, and any combination thereof. The uplink communication channel can be established between the base station and at least one user equipment.

In some implementations, at least one of the receiving, the detecting, the determining, and the compensating can be performed by one or more components at Layer 1 of the base station. The method can also include providing a compensated phase information of at least one symbol to one or more components at Layer 2 of the base station for decoding of the received signal.

In some implementations, receiving of the signal can also include demodulating the received signal to generate an equalized received signal.

In some implementations, the uplink channel can include at least one of the following: a physical uplink control channel ("PUCCH") and a physical uplink shared channel ("PUSCH"). The method can also include repeating the detecting, the determining and the compensating for each symbol in the constellation, generating a cumulative angular difference based on the repeating, and providing the cumulative angular difference to one or more components at Layer 2 (or any higher layers) of the base station.

In some implementations, the method can also include receiving another signal containing another frame including a plurality of another symbols on the uplink communication channel. One or more of these symbols can be compensated, using one or more components at Layer 1 of the base station, using the generated cumulative angular difference. One or more of such symbols can be adjacent to the expected reference symbol.

In some implementations, the method can further include adjusting the generated cumulative angular difference based on a variation on the uplink communication channel, and performing the detecting, the determining, and the compensating for remaining symbols in the plurality of other symbols.

In some exemplary, non-limiting, implementations, the user equipment can be located on a high speed train.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method for enhancing reception of signals in a wireless communication system, comprising:
   receiving a signal containing a frame including a plurality of symbols on an uplink communication channel, wherein the signal is received from at least one user equipment monitored for a variation in at least one channel condition;
   detecting an angular position of at least one symbol in the plurality of symbols in a constellation of symbols, wherein the plurality of symbols include equalized symbols, wherein the symbol is assumed to be located in a predetermined quadrant of the constellation;
   determining, without a rotation of the constellation, an angular difference corresponding to a phase error between the detected angular position of the at least one symbol and an expected reference angular position in the constellation of symbols corresponding to an expected reference symbol corresponding to the received frame; and
   compensating, using the determined phase error, a phase of the at least one symbol, wherein the phase of the at least one symbol is compensated using weighted angular positions of at least a portion of the plurality of symbols determined as function of a weighting factor across at least the portion of the plurality of symbols.

2. The method according to claim 1, wherein at least one of the receiving, the detecting, the determining, and the compensating is performed by a base station having at least one processor communicatively coupled to at least one memory, the base station further including a radio transmitter and a radio receiver.

3. The method according to claim 2, where the base station includes at least one of the following: an eNodeB base station, a gNodeB base station, and any combination thereof.

4. The method according to claim 2, wherein the uplink communication channel is established between the base station and at least one user equipment.

5. The method according to claim 4, wherein the at least one user equipment is located on a high speed train.

6. The method according to claim 2, wherein at least one of the receiving, the detecting, the determining, and the compensating is performed by one or more components at Layer 1 of the base station.

7. The method according to claim 6, further comprising providing a compensated phase information of the at least one symbol to one or more components at Layer 2 of the base station for decoding of the received signal.

8. The method according to claim 2, wherein the uplink channel includes at least one of the following: a physical uplink control channel ("PUCCH") and a physical uplink shared channel ("PUSCH").

9. The method according to claim 8, further comprising
   repeating the detecting, the determining and the compensating for each symbol in the constellation;
   generating a cumulative angular difference based on the repeating;
   providing the cumulative angular difference to one or more components at Layer 2 of the base station.

10. The method according to claim 9, further comprising
    receiving another signal containing another frame including a plurality of another symbols on the uplink communication channel; and compensating, using one or more components at Layer 1 of the base station, at least another symbol in the plurality of another symbols using the generated cumulative angular difference.

11. The method according to claim 10, wherein the at least another symbol is adjacent to the expected reference symbol.

12. The method according to claim 11, further comprising adjusting the generated cumulative angular difference based on a variation on the uplink communication channel; and performing the detecting, the determining, and the compensating for remaining symbols in the plurality of another symbols.

13. The method according to claim 1, wherein the receiving further comprises demodulating the received signal to generate an equalized received signal.

14. An apparatus for enhancing reception of signals in a wireless communication system, comprising:
at least one programmable processor; and
a non-transitory machine-readable medium storing instructions that, when executed by the at least one programmable processor, cause the at least one programmable processor to perform operations comprising:
receiving a signal containing a frame including a plurality of symbols on an uplink communication channel, wherein the signal is received from at least one user equipment monitored for a variation in at least one channel condition;
detecting an angular position of at least one symbol in the plurality of symbols in a constellation of symbols, wherein the plurality of symbols include equalized symbols, wherein the symbol is assumed to be located in a predetermined quadrant of the constellation;
determining, without a rotation of the constellation, an angular difference corresponding to a phase error between the detected angular position of the at least one symbol and an expected reference angular position in the constellation of symbols corresponding to an expected reference symbol corresponding to the received frame; and
compensating, using the determined phase error, a phase of the at least one symbol, wherein the phase of the at least one symbol is compensated using weighted angular positions of at least a portion of the plurality of symbols determined as function of a weighting factor across at least the portion of the plurality of symbols.

15. The apparatus according to claim 14, wherein at least one of the receiving, the detecting, the determining, and the compensating is performed by a base station having at least one processor communicatively coupled to at least one memory, the base station further including a radio transmitter and a radio receiver.

16. The apparatus according to claim 15, where the base station includes at least one of the following: an eNodeB base station, a gNodeB base station, and any combination thereof.

17. The apparatus according to claim 15, wherein the uplink communication channel is established between the base station and at least one user equipment.

18. The apparatus according to claim 17, wherein the at least one user equipment is located on a high speed train.

19. The apparatus according to claim 15, wherein at least one of the receiving, the detecting, the determining, and the compensating is performed by one or more components at Layer 1 of the base station.

20. The apparatus according to claim 19, wherein the operations further comprise providing a compensated phase information of the at least one symbol to one or more components at Layer 2 of the base station for decoding of the received signal.

21. The apparatus according to claim 15, wherein the uplink channel includes at least one of the following: a physical uplink control channel ("PUCCH") and a physical uplink shared channel ("PUSCH").

22. The apparatus according to claim 21, wherein the operations further comprise
repeating the detecting, the determining and the compensating for each symbol in the constellation;
generating a cumulative angular difference based on the repeating;
providing the cumulative angular difference to one or more components at Layer 2 of the base station.

23. The apparatus according to claim 22, wherein the operations further comprise
receiving another signal containing another frame including a plurality of another symbols on the uplink communication channel; and
compensating, using one or more components at Layer 1 of the base station, at least another symbol in the plurality of another symbols using the generated cumulative angular difference.

24. The apparatus according to claim 23, wherein the at least another symbol is adjacent to the expected reference symbol.

25. The apparatus according to claim 24, wherein the operations further comprise
adjusting the generated cumulative angular difference based on a variation on the uplink communication channel; and
performing the detecting, the determining, and the compensating for remaining symbols in the plurality of another symbols.

26. The apparatus according to claim 14, wherein the receiving further comprises demodulating the received signal to generate an equalized received signal.

27. A computer program product for enhancing reception of signals in a wireless communication system, comprising a non-transitory machine-readable medium storing instructions that, when executed by at least one programmable processor, cause the at least one programmable processor to perform operations comprising:
receiving a signal containing a frame including a plurality of symbols on an uplink communication channel, wherein the signal is received from at least one user equipment monitored for a variation in at least one channel condition;
detecting an angular position of at least one symbol in the plurality of symbols in a constellation of symbols, wherein the plurality of symbols include equalized symbols, wherein the symbol is assumed to be located in a predetermined quadrant of the constellation;
determining, without a rotation of the constellation, an angular difference corresponding to a phase error between the detected angular position of the at least one symbol and an expected reference angular position in the constellation of symbols corresponding to an expected reference symbol corresponding to the received frame; and compensating, using the determined phase error, a phase of the at least one symbol, wherein the phase of the at least one symbol is compensated using weighted angular positions of at least a portion of the plurality of symbols determined as function of a weighting factor across at least the portion of the plurality of symbols.

28. The computer program product according to claim 27, wherein at least one of the receiving, the detecting, the determining, and the compensating is performed by a base station having at least one processor communicatively coupled to at least one memory, the base station further including a radio transmitter and a radio receiver.

29. The computer program product according to claim 28, where the base station includes at least one of the following: an eNodeB base station, a gNodeB base station, and any combination thereof.

30. The computer program product according to claim 28, wherein the uplink communication channel is established between the base station and at least one user equipment.

31. The computer program product according to claim 30, wherein the at least one user equipment is located on a high speed train.

32. The computer program product according to claim 28, wherein at least one of the receiving, the detecting, the determining, and the compensating is performed by one or more components at Layer 1 of the base station.

33. The computer program product according to claim 32, wherein the operations further comprise providing a compensated phase information of the at least one symbol to one or more components at Layer 2 of the base station for decoding of the received signal.

34. The computer program product according to claim 28, wherein the uplink channel includes at least one of the following: a physical uplink control channel ("PUCCH") and a physical uplink shared channel ("PUSCH").

35. The computer program product according to claim 34, wherein the operations further comprise
repeating the detecting, the determining and the compensating for each symbol in the constellation;
generating a cumulative angular difference based on the repeating;
providing the cumulative angular difference to one or more components at Layer 2 of the base station.

36. The computer program product according to claim 35, wherein the operations further comprise
receiving another signal containing another frame including a plurality of another symbols on the uplink communication channel; and
compensating, using one or more components at Layer 1 of the base station, at least another symbol in the plurality of another symbols using the generated cumulative angular difference.

37. The computer program product according to claim 36, wherein the at least another symbol is adjacent to the expected reference symbol.

38. The computer program product according to claim 37, wherein the operations further comprise
adjusting the generated cumulative angular difference based on a variation on the uplink communication channel; and
performing the detecting, the determining, and the compensating for remaining symbols in the plurality of another symbols.

39. The computer program product according to claim 27, wherein the receiving further comprises demodulating the received signal to generate an equalized received signal.

* * * * *